United States Patent
Menegazzi (10) Patent No.: US 11,072,300 B2
(45) Date of Patent: Jul. 27, 2021

(54) VEHICLE STRUCTURE SUB-UNIT, WITH CRASH-BOX MODULES

(71) Applicant: C.R.F. Società Consortile per Azioni, Orbassano (IT)

(72) Inventor: Stefano Menegazzi, Orbassano (IT)

(73) Assignee: C.R.F. SOCIETA CONSORTILE PER AZIONI, Orbassano (IT)

(*) Notice: Subject to any disclaimer, the term of this patent is extended or adjusted under 35 U.S.C. 154(b) by 57 days.

(21) Appl. No.: 16/703,167

(22) Filed: Dec. 4, 2019

(65) Prior Publication Data

US 2020/0189502 A1 Jun. 18, 2020

(30) Foreign Application Priority Data

Dec. 12, 2018 (EP) ..................... 18211857

(51) Int. Cl.
*B60J 7/00* (2006.01)
*B60R 19/18* (2006.01)
(Continued)

(52) U.S. Cl.
CPC .............. *B60R 19/18* (2013.01); *B60R 19/04* (2013.01); *B60R 19/34* (2013.01);
(Continued)

(58) Field of Classification Search
CPC ......... B60R 19/34; B60R 19/18; B60R 19/03; B60R 19/023; B62D 21/152
See application file for complete search history.

(56) References Cited

U.S. PATENT DOCUMENTS 6,299,226 B1 * 10/2001 Kroning ................. B60R 19/18
293/120
9,187,127 B2 * 11/2015 Tyan ..................... B62D 21/152
(Continued)

FOREIGN PATENT DOCUMENTS

JP 2000127873 A 9/2000
JP 2006056471 A 2/2006
(Continued)

OTHER PUBLICATIONS

European Search Report dated Mar. 14, 2019.

*Primary Examiner* — Kiran B Patel
(74) *Attorney, Agent, or Firm* — Heslin Rothenberg Farley & Mesiti P.C.; Victor A. Cardona, Esq.

(57) ABSTRACT

A vehicle structure sub-unit includes a cross-member of metal material and two crash-box modules with their front surfaces welded or glued to the rear wall of the cross-member. A reinforcing metal plate is interposed between the front surface of at least one of the two crash-box modules and the rear wall. The rear wall has a depressed flat portion in which the reinforcing plate is received, in such a way that the surface of the reinforcing plate facing the crash-box module is substantially flush with the surface of the rear wall. A depressed portion of the rear wall is located in an offset position, closer to the center of the cross-member, with respect to the crash-box module, in such a way that the reinforcing plate is in contact only with a part of the front surface of the crash-box module, the remaining part of the front surface being in direct contact with the rear wall.

7 Claims, 4 Drawing Sheets

(51) Int. Cl.
   *B60R 19/04*   (2006.01)
   *B60R 19/34*   (2006.01)
   *B62D 21/15*   (2006.01)

(52) U.S. Cl.
   CPC ... *B60R 2019/182* (2013.01); *B60R 2019/186* (2013.01); *B62D 21/152* (2013.01)

(56) References Cited

U.S. PATENT DOCUMENTS

| | | | | |
|---|---|---|---|---|
| 9,199,592 | B1* | 12/2015 | Nusier | B60R 19/34 |
| 2002/0047281 | A1* | 4/2002 | Hartel | B60R 19/18 |
| | | | | 293/102 |
| 2005/0104392 | A1* | 5/2005 | Liebhard | B60R 19/18 |
| | | | | 293/132 |
| 2006/0181090 | A1* | 8/2006 | Boivin | B60R 19/18 |
| | | | | 293/146 |
| 2007/0040398 | A1* | 2/2007 | Lutke-Bexten | B60R 19/18 |
| | | | | 293/102 |
| 2008/0116719 | A1* | 5/2008 | Bae | B60R 19/34 |
| | | | | 296/187.09 |
| 2008/0217935 | A1* | 9/2008 | Braunbeck | B60R 19/34 |
| | | | | 293/132 |
| 2009/0200811 | A1* | 8/2009 | Erzgraber | B60R 19/18 |
| | | | | 293/120 |
| 2010/0066124 | A1* | 3/2010 | Terada | B60R 19/34 |
| | | | | 296/187.09 |
| 2010/0133859 | A1* | 6/2010 | Lutke-Bexten | B60R 19/18 |
| | | | | 293/102 |
| 2010/0194125 | A1* | 8/2010 | Wibbeke | B60R 19/24 |
| | | | | 293/120 |
| 2011/0187135 | A1* | 8/2011 | Kano | B60R 19/34 |
| | | | | 293/133 |
| 2013/0001964 | A1* | 1/2013 | Freundl | B60R 19/18 |
| | | | | 293/133 |
| 2014/0062107 | A1* | 3/2014 | Kim | B60R 19/34 |
| | | | | 293/133 |
| 2014/0354008 | A1* | 12/2014 | Sakakibara | B60R 19/34 |
| | | | | 296/187.1 |
| 2015/0246651 | A1* | 9/2015 | Muraji | B62D 21/152 |
| | | | | 296/187.1 |
| 2015/0298634 | A1* | 10/2015 | Hara | B60R 19/24 |
| | | | | 293/133 |
| 2016/0039373 | A1* | 2/2016 | Yamada | B60R 19/12 |
| | | | | 293/132 |
| 2016/0144814 | A1* | 5/2016 | Ahn | B23K 9/16 |
| | | | | 293/133 |
| 2016/0332671 | A1* | 11/2016 | De Leo | B62D 21/155 |
| 2017/0021868 | A1* | 1/2017 | Watanabe | B62D 21/152 |
| 2017/0057440 | A1* | 3/2017 | Kitakata | B60R 19/30 |
| 2017/0088075 | A1* | 3/2017 | Hashimoto | F16F 7/00 |
| 2017/0210316 | A1* | 7/2017 | Duffe | B60R 19/04 |
| 2017/0274851 | A1* | 9/2017 | Schneider | B60R 19/24 |
| 2018/0001933 | A1* | 1/2018 | Piermarioli | B62D 27/023 |
| 2018/0037179 | A1* | 2/2018 | Steinebach | B23K 31/02 |
| 2018/0162452 | A1* | 6/2018 | Hirota | B62D 21/02 |
| 2018/0178742 | A1* | 6/2018 | Hojo | B60R 19/26 |
| 2018/0257586 | A1* | 9/2018 | Kitakata | B60R 19/03 |
| 2018/0281710 | A1* | 10/2018 | Lindblom | B60R 19/18 |
| 2018/0334121 | A1* | 11/2018 | Sabu | B62D 21/152 |
| 2019/0291670 | A1* | 9/2019 | Toelle | B60R 19/34 |
| 2019/0351854 | A1* | 11/2019 | Bae | B60R 19/18 |
| 2019/0381960 | A1* | 12/2019 | Sovic | B60R 19/023 |
| 2020/0324823 | A1* | 10/2020 | Kawamura | B62D 21/08 |
| 2020/0384934 | A1* | 12/2020 | Yotsuyanagi | B60R 19/34 |
| 2021/0039574 | A1* | 2/2021 | Unal | B60R 19/02 |
| 2021/0053518 | A1* | 2/2021 | Karlsson | B60R 19/34 |

FOREIGN PATENT DOCUMENTS

| | | |
|---|---|---|
| JP | 2008168897 A | 7/2008 |
| JP | 2011126492 A | 6/2011 |

\* cited by examiner

VEHICLE STRUCTURE SUB-UNIT, WITH CRASH-BOX MODULES

CROSS REFERENCE TO RELATED APPLICATIONS

This application claims priority from European Patent Application No. EP 18211857.0 filed on Dec. 12, 2018, the entire disclosure of which is incorporated herein by reference.

FIELD OF THE INVENTION

The present invention relates to vehicle structures and relates in particular to a vehicle structure sub-unit configured as a structure capable of absorbing at least part of the energy of an impact, and usable as a front module and/or as a rear module of a vehicle structure.

In particular, the invention relates to a known type of vehicle structure sub-unit comprising:
- a cross-member made of metal material, including, with reference to the mounted condition on the vehicle, a front wall, a rear wall, an upper wall and a lower wall (one or more internal partitions may also be provided),
- two crash-box modules welded or glued to the rear wall of the cross-member, near two opposite ends of the cross-member and extending in a direction parallel to the longitudinal direction of the vehicle, with reference to the mounted condition on the vehicle, starting from said rear wall of the cross-member,
- each crash-box module having a tubular structure of metal material, having an upper wall and a substantially horizontal lower wall and two side walls substantially vertical and parallel to each other (one or more internal partitions may also be provided),
- so that each crash-box module has a front surface shaped like a quadrangular ring, with a horizontal upper edge, a horizontal lower edge, a vertical inner edge, facing towards the center of the cross-member, and a vertical outer edge,
- said front surface of the crash-box module being glued or welded to the rear wall of the cross-member.

PRIOR ART

Sub-units of the type indicated above have been used for some time in vehicles in order to absorb at least part of the energy of a front or rear impact of the vehicle. These sub-units must be designed in such a way as to obtain the required energy absorption capacity without, however, excessively increasing the weight of the structure and without adopting complex configurations that result in a laborious and costly construction. The problem is not easy to solve, given in particular the criticality of the connection area between the crash-box modules and the cross-member (due to the concentration of stress in this area) and also taking into account the fact that the impact is not generally evenly distributed throughout the structure, and that the intensity of the impact can vary greatly from case to case.

There is, therefore, a need for further improvements in this field.

OBJECT OF THE INVENTION

An object of the present invention is to provide a vehicle structure sub-unit of the type indicated at the beginning of the present description which has a high impact energy absorption capacity, without involving a greater risk of breakage, thanks in particular to a better distribution of the stresses in the areas connecting the cross-member and the crash-box modules.

Another object of the invention is to provide the aforesaid objective with a structure having an extremely simple configuration, which involves correspondingly simple and economical manufacturing operations.

Another object of the invention is that of achieving the aforesaid objectives without requiring any appreciable increase in the weight of the structure with respect to the known solutions, indeed possibly allowing a reduction in weight.

Yet another object of the invention is to provide a structure of the type indicated above which can be produced by a series of different technologies as alternatives to each other, so as to allow selection of the best technology for each specific application.

SUMMARY OF THE INVENTION

In view of achieving one or more of the aforesaid objects, the present invention relates to a vehicle structure sub-unit having the characteristics disclosed at the beginning of this description and further characterized in that:
- a reinforcing metal plate is interposed between the front surface of at least one of the two crash-box modules and the rear wall of the cross-member, rigidly connected by welding or gluing both to the rear wall of the cross-member and to the front surface of the crash-box module,
- the rear wall of the cross-member has a depressed flat portion in which said reinforcing plate is received, in such a way that the surface of the reinforcing plate facing the crash-box module is substantially flush with the surface of the rear wall of the cross-member adjacent to said depressed portion,
- said depressed portion of the rear wall of the cross-member within which the reinforcing plate is received is located in an offset position, closer to the center of the cross-member, with respect to said crash-box module,
- in such a way that the reinforcing plate is in contact with just a part of the front surface of the crash-box module, the remaining part of said front surface being in direct contact with the rear wall of the cross-member.

In an embodiment example, which is not to be understood in a limiting sense, the aforesaid cross-member has a central portion and two end portions inclined as an arrow with respect to the central portion. Each crash-box module with which the reinforcing plate is associated has a front surface contained in an inclined plane, substantially parallel to the rear wall of the corresponding end portion of the cross-member, so that the vertical inner edge of the front surface of the crash-box module is in a longitudinally more advanced position with respect to the vertical outer edge of said front surface. The aforesaid depressed portion of the rear wall of the cross-member is located in the aforesaid offset position, in such a way that the reinforcing plate is in contact with the vertical inner edge of the front surface of the crash-box module, as well as with part of the upper edge and the lower edge of the front surface, but not with the vertical outer edge.

The reinforcing plate may consist of a single flat wall, or have an L-shaped or C-shaped configuration, for example, with a portion that is received within said depressed portion of the rear wall of the cross-member, and one or more wings welded or glued to the lower wall and/or upper wall of the cross-member.

Thanks to the aforesaid characteristics, the invention allows a series of advantages to be obtained.

Firstly, the reinforcing plate provided according to the invention allows excessive concentration of stress to be avoided in the connection area between the crash-box modules and the cross-member, achieving a better distribution of the stresses and consequently a better capacity of the entire structure to absorb impact energy without causing a risk of breakage.

Secondly, the aforesaid result is obtained by limiting the addition of material to a minimum and, in particular, without requiring a general increase in the thickness of the cross-member walls and the crash-box modules, which would result in an excessive increase in the weight of the structure.

Another advantage consists in that the use of a reinforcing plate of the necessary thickness in conjunction with the provision of the corresponding depressed portion of the wall also makes the operations necessary for welding or gluing the crash-box modules to the cross-member simpler and less expensive, since the depressed portion can be made flat, even when the wall of the cross-member is not.

Finally, the offset position of the reinforcing plate, which overlaps only on part of the front surface of the crash-box module, again achieves the required objective of greater energy absorption capacity (taking into account the asymmetric distribution of the stresses to which each crash-box module is subject in the case of impact) keeping the dimensions of the reinforcement plate to a minimum and consequently the weight of the structure.

The invention also relates to a method for manufacturing a structure of the type indicated above, comprising the steps of:
  forming a cross-member made of metal material, including a front wall, a rear wall, an upper wall and a lower wall (as well as one or more possible internal partitions),
  providing two crash-box modules each having a tubular structure of metal material with an upper wall, a lower wall and two side walls, in addition to one or more possible inner partitions,
  arranging said crash-box modules with their front surfaces in contact with the rear wall of the end portions of the cross-member, and welding or gluing said crash-box modules to said rear wall of the cross-member,
  said method being characterized in that:
  before connecting the crash-box modules to the cross-member, the rear wall of the aforesaid cross-member is deformed to define a depressed flat portion of said rear wall at the connection area of at least one of said crash-box modules,
  said reinforcing plate is welded or glued within said depressed portion of the rear wall of the cross-member, in such a way that the surface of the reinforcing plate facing the crash-box module is substantially flush with the surface of the rear wall of the cross-member adjacent to said depressed portion,
  after connecting said reinforcing plate to the cross-member, each crash-box module is welded or glued to the rear wall of the cross-member and to the aforesaid reinforcing plate,
  said depressed portion of the rear wall of the cross-member being formed in an offset position, closer to the center of the cross-member, with respect to the crash-box module, with reference to the mounted condition of the crash-box module,
  in such a way that the reinforcing plate is in contact with just a part of the front surface of the crash-box module, the remaining part of said front surface being in direct contact with the rear wall of the cross-member, and being welded or glued directly to said rear wall.

DETAILED DESCRIPTION OF THE INVENTION

Further characteristics and advantages of the invention will become apparent from the description that follows with reference to the attached drawings, provided purely by way of non-limiting example, wherein.

In the drawings, the reference number 1 indicates—in its entirety—a sub-unit of a motor-vehicle structure, usable as a front module or rear module, with impact energy absorption capacity. In the example described below, reference will be made to a vehicle structure sub-unit usable as a front module, being understood that what is indicated herein is, of course, also applicable to the case of a rear module.

Figures 1, 2:
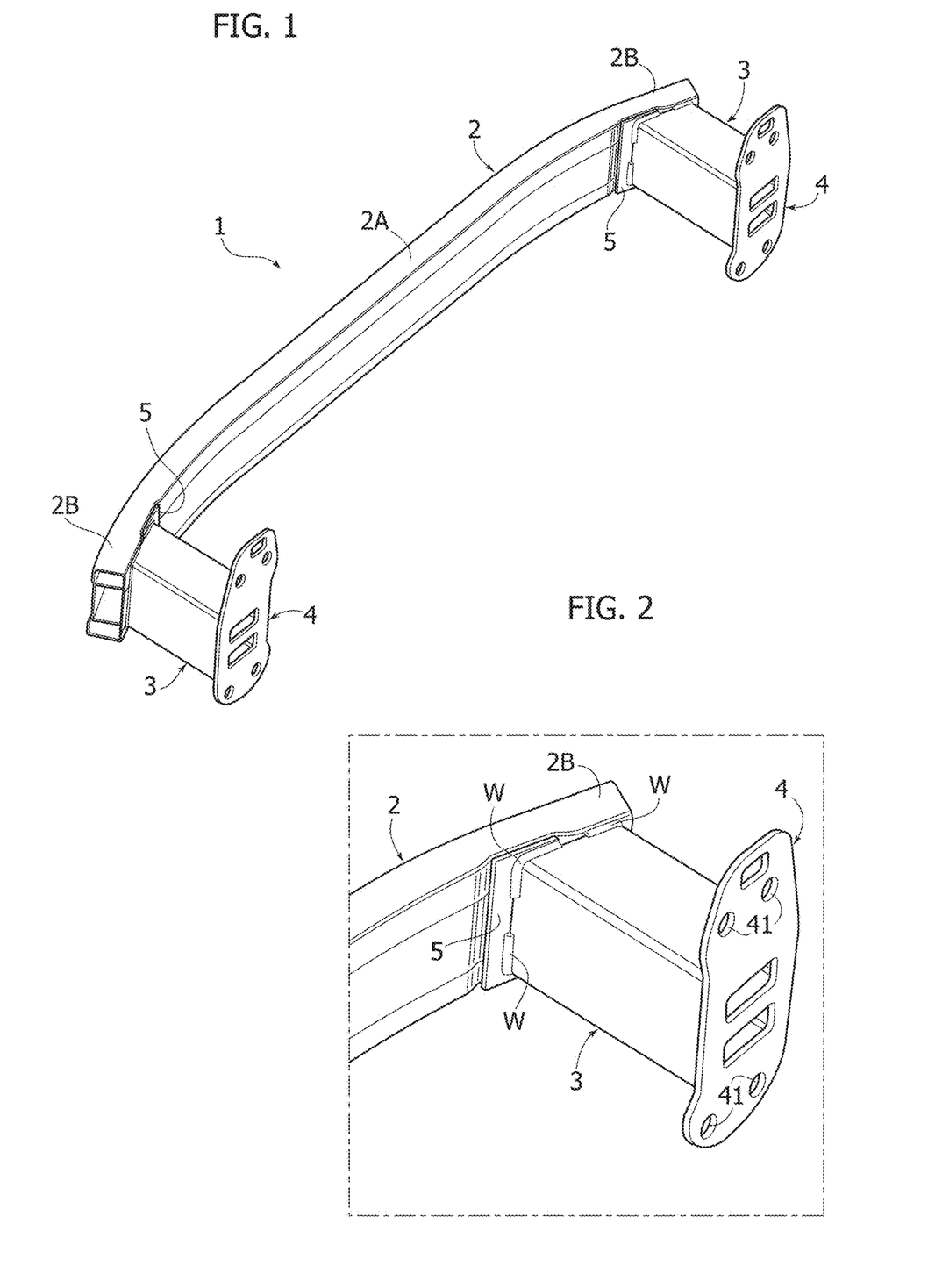
FIG. 1 is a perspective view of a vehicle structure sub-unit according to a preferred embodiment of the present invention.
FIG. 2 is a perspective view, on an enlarged scale, of a detail of FIG. 1.

With reference to the illustrated example, the sub-unit 1 includes a cross-member 2 with a central portion 2A and end portions 2B to which two crash-box modules 3 are rigidly connected.

The cross-member 2 has a structure consisting of metal material, for example, of aluminum or steel, including at least one front wall 21, one rear wall 22, one upper wall 23 and one lower wall 24.

In the specific example illustrated here, which is not to be understood in a limiting sense, the cross-member 2 is made by aluminum extrusion and also includes two horizontal inner partitions 25, 26 which divide the inner cavity of the cross-member 2 into three different chambers, including a central chamber 27, an upper chamber 28 and a lower chamber 29. The cross-member 2 could also be obtained from one or more folded and welded sheet metal elements.

Still with reference to the specific example illustrated, the end portions 2B of the cross-member 2 have an arrow-shaped configuration with respect to the central portion 2A. This configuration is obtained by a permanent deformation of the cross-member 2 following the extrusion operation with which an initially straight cross-member is obtained.

Each of the two crash-box modules 3 also has a structure made of sheet metal, for example, of steel or aluminum. Of course, the materials of the cross-member 2 and of the crash-boxes 3 must be compatible materials to allow the welding operations necessary to rigidly connect said elements to each other. As an alternative to welding and/or in addition to it, these elements can be glued together. In the latter case, the materials of the cross-member, crash-box and reinforcement plate may also be of non-weldable materials.

Figure 7:
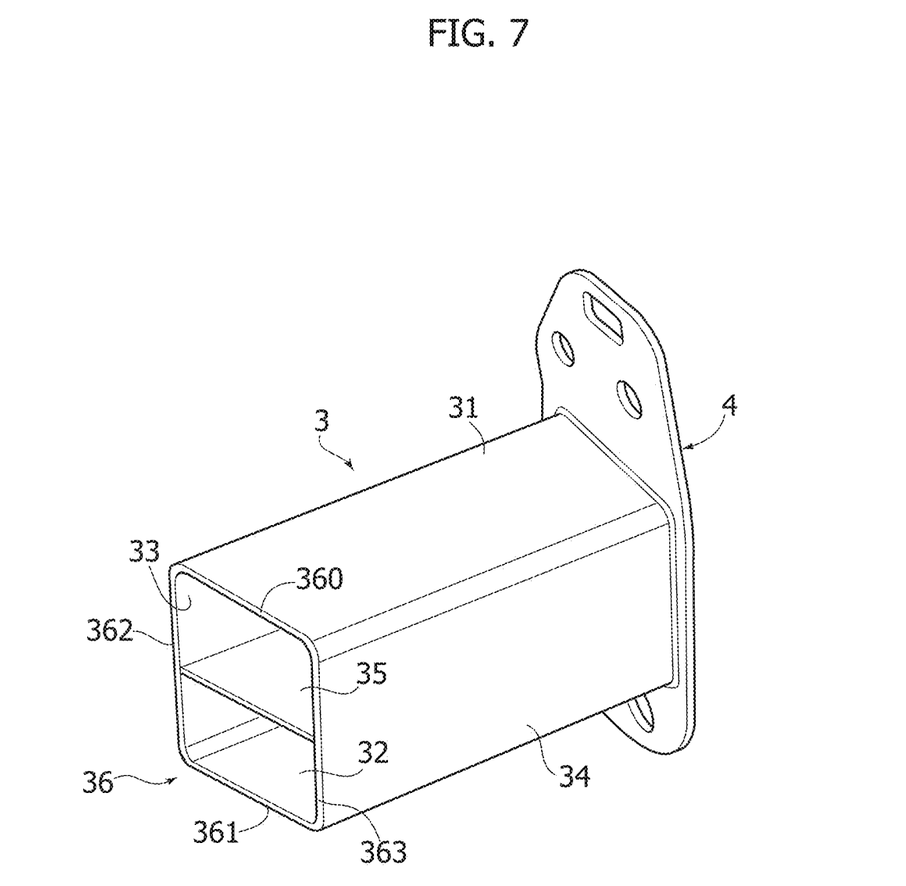
FIG. 7 is a perspective view of a single crash-box module.

With reference to the mounted condition of the structure on the vehicle, each crash-box module 3 comprises a tubular structure including a horizontal upper wall 31, a horizontal lower wall 32, an inner side wall 33, facing the center of the cross-member 2, and an outer side wall 34. The walls 33, 34 are arranged vertically and parallel to each other.

In the case of the specific example illustrated, the structure of each crash-box 3 also includes an inner horizontal partition 35 (FIG. 5), for example, obtained in one piece with the crash-box by an extrusion operation.

In a manner known per se, each crash-box module 3 is also provided with a rear flange 4 consisting of a plate welded to the rear end of the crash-box module, intended to be used to connect the sub-unit 1 at two longitudinal struts (not illustrated) forming part of the vehicle structure. Each plate 4 is provided with holes 41 for engaging bolts connecting the plate 4 to corresponding flanges associated with the aforesaid longitudinal struts.

According to a fundamental characteristic of the present invention, a reinforcing plate 5 is provided for at least one of the two crash-box modules, preferably for both, interposed in the connection between the crash-box module 3 and the cross-member 2. The reinforcing plate 5 is received on a depressed flat portion 220 of the rear wall 22 of the cross-member 2 (see in particular FIG. 4). The depth of the depressed portion 220 and the thickness of the reinforcing plate 5 substantially correspond to each other, in such a way that the surface 5A of the reinforcing plate 5 that faces the crash-box module is arranged substantially flush with the adjacent portion of the outer surface 22A of the rear wall 22 of the cross-member 2. In other words, the surfaces 5A, 22A are substantially coplanar. Moreover, as clearly visible in FIG. 4, the depressed portion 220 of the rear wall 22 of the cross-member 2 within which the reinforcing plate 5 is arranged has an offset position, moved towards the center of the cross-member 2, with respect to the crash-box module 3, so that the reinforcing plate 5A is only in contact with a portion of the front surface of the crash-box module 3.

During manufacture of the cross-member 2, once this cross-member has been obtained (for example, through the extrusion and subsequent folding operations that have been described above), a localized deformation operation is then carried out in order to obtain the depressed flat portion 220 of the rear wall 22. The localized deformation can also be obtained before the bending operation or concomitantly with it. Once the depressed portion 220 is obtained, and before the crash-box 3 modules are connected to the cross-member 2, the reinforcing plate 5 is welded or glued against the surface of the depressed portion 220.

Figure 5:
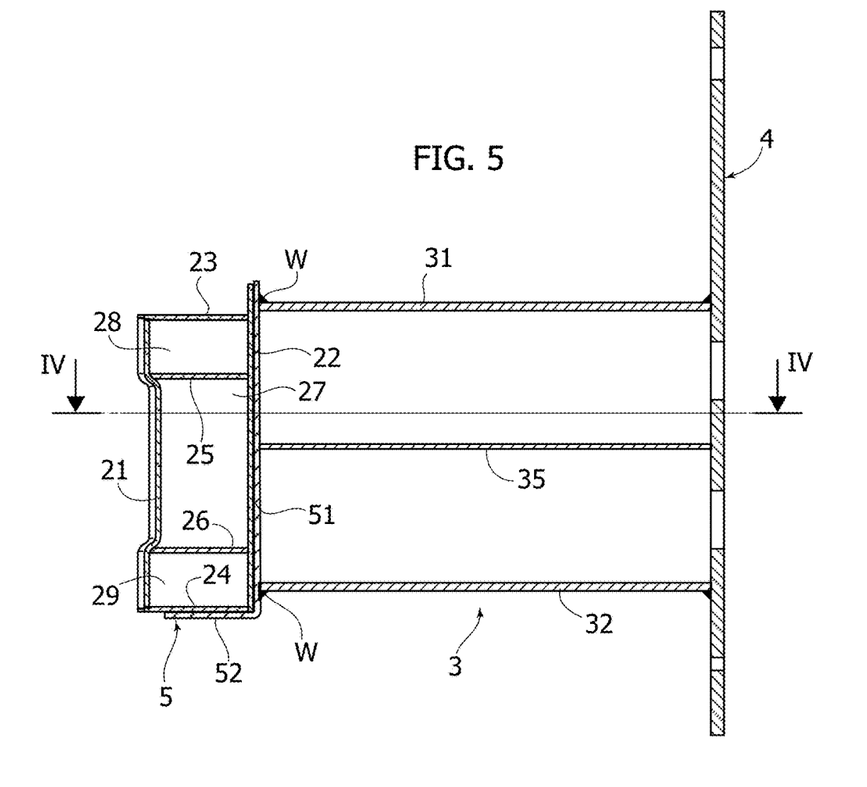
FIG. 5 is a cross-sectional view along the line V-V of FIG. 4, FIGS. 6A, 6B, 6C are perspective views of three different embodiments of the reinforcement plate provided in the structure according to the invention.
Figure 6A:
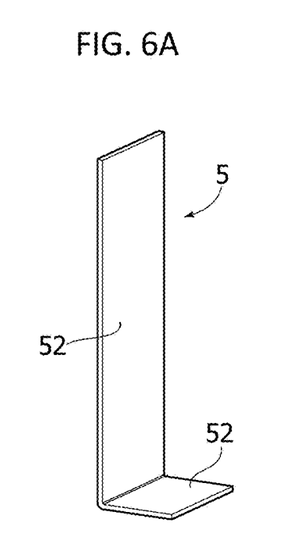
Figure 6B:
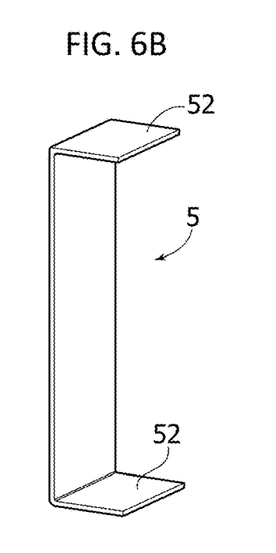
Figure 6C:
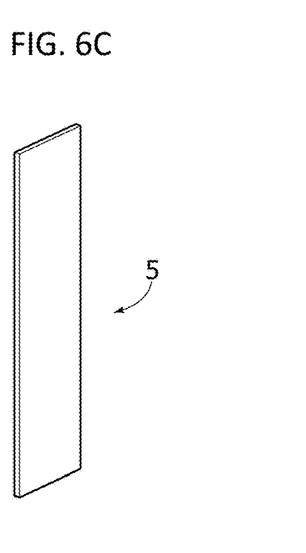

FIGS. 6A, 6B, 6C show three different alternative configurations of the reinforcing plate 5. In the case of FIG. 6C, the reinforcing plate has a simplified configuration, contained in a single plane. In this case, the plate 5 is only welded or glued to the surface of the depressed portion 220 of the rear wall 22 of the cross-member 2. FIG. 6A presents the case in which the reinforcing plate 5 has an L-shaped configuration, with a main portion 51 that is received over the depressed portion 220, and an end-piece 52, which is welded or glued to the lower wall 24 of the cross-member 2, as shown in FIG. 5, or to the upper wall 23.

FIG. 6B shows a further embodiment in which the reinforcing plate 5 has a C-shaped configuration, with end wings being welded to the lower wall and to the upper wall of the cross-member 2, respectively.

With reference to the specific example illustrated here (see FIG. 7), the front surface 36 of the crash-box module 3 has a quadrangular ring configuration, with a horizontal upper edge 360, a horizontal lower edge 361, an inner side edge 362, facing the center of the cross-member 2, and an outer side edge 363. The front surface of the module 3 is contained in an inclined plane, parallel to the rear wall 22 of the end portion 2B of the cross-member, in such a way that the inner side edge 362 is in a longitudinally more advanced position with respect to the outer side edge 363.

Figures 3, 4:
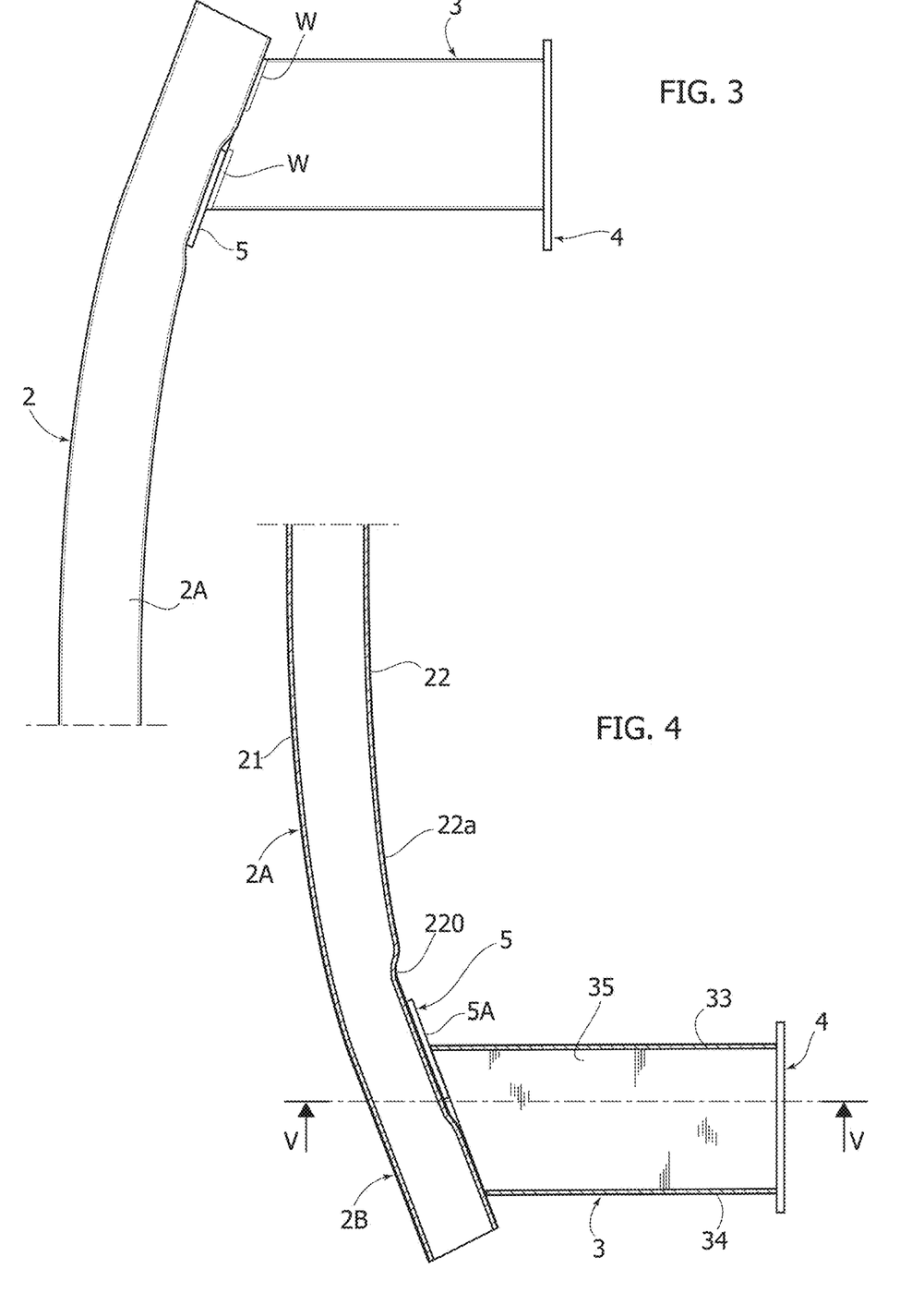
FIG. 3 is a plan view of a detail of FIG. 1.
FIG. 4 is a cross-sectional view along the line IV-IV of FIG. 5.

As can be seen in FIG. 4, the offset positioning of the depressed portion 220, and consequently of the reinforcing plate 5, causes the reinforcing plate 5 to be in contact only with the inner side edge 362 of the front surface of the crash-box module 3 (and possibly with part of the upper and lower edges 360, 361), but not with the outer side edge 363. This allows a better distribution of the stresses in the case of impact of the vehicle in the most critical area, without significantly increasing the weight of the structure.

During manufacturing operations, once the reinforcing plate 5 has been welded or glued to the cross-member 2, the crash-box module 3 is welded or glued to the cross-member 2 and to the reinforcing plate 5.

Still by way of example, FIG. 2 shows the weld seams W between the front surface of the crash-box module on one side and the reinforcing plate 5 and the cross-member 2 on the other side. The front surface 36 of the crash-box module is partly in contact with the reinforcing plate 5 and partly in direct contact with the rear wall 22 of the cross-member 2. It should be noted that FIG. 2 shows the application of the reinforcement plate 5 to the right crash-box module 3, while the cross-sectional views of FIGS. 4, 5 show the application of the reinforcing plate to the left crash-box module. Although the preferred solution envisages that reinforcing plates are provided for both crash-box modules, the possibility of associating the reinforcing plate with only one of the two crash-box modules is not excluded. This asymmetric structure configuration can be motivated, for example, by the need to differentiate and direct the load path following the impact on one side of the vehicle with respect to the other.

In a concrete embodiment, the thickness of the reinforcing plate 5 can be between 0.5 and three times the minimum thickness of the walls of the cross-member 2, in the case that said cross-member is produced by extrusion. In other cases, it is preferable that the thickness of the reinforcing plate is not less than 0.3 mm and is not greater than twice the maximum thickness of the walls of the cross-member 2. More specifically, typical thicknesses of the reinforcing plate 5 are between 0.5 mm and 5 mm. The width of the reinforcing plate 5, in the direction transverse to the longitudinal direction of the vehicle, may be between 1/10 of the minimum transverse width of the crash-box module 3, and three times the aforesaid transverse width of the crash-box module 3. Typical widths of the reinforcement plate are between 20 mm and 200 mm. The height of the reinforcement plate is between 10% and 110% of the crash-box height.

As is evident, use of the reinforcing plate enables the stresses to be distributed uniformly in the interface area between the crash-box module 3 and the cross-member 2. Distribution of the stress in the interface area between the crash-box module 3 and cross-member 2 allows a consequent decrease in the thickness of the walls of the cross-member 2 and the crash-box module 3. As a result, the weight of the component does not increase, but rather, can be reduced compared to a conventional solution. Reduction of the material also leads to a reduction in production costs.

Furthermore, arrangement of the reinforcing plate 5 within a depressed portion of the rear wall of the cross-member allows the surface of the reinforcing plate 5 to be kept facing the crash-box module 3 substantially flush with the adjacent surface of the rear wall of the cross-member, which simplifies the operations of connection between cross-member and crash-box modules, reduces the complexity of the interface between crash box and cross-member, and reduces its cost. Thanks to the illustrated arrangement, the front surface 36 of the crash-box can be made flat and can, therefore, can be obtained with a simple and low-cost technology (for example, by cutting an extruded product).

Of course, without prejudice to the principle of the invention, the details of construction and the embodiments may vary widely with respect to those described and illustrated purely by way of example, without departing from the scope of the present invention.

What is claimed is:

1. A vehicle structure sub-unit, comprising:
   a cross-member made of metal material, including, with reference to a mounted condition on the vehicle, a front wall, a rear wall, an upper wall and a lower wall,
   two crash-box modules welded or glued to the rear wall of the cross-member, near two opposite ends of the cross-member and extending in a direction parallel to a longitudinal direction of the vehicle, with reference to the mounted condition on the vehicle, starting from said rear wall of the cross-member,
   each crash-box module of said two crash-box modules having a tubular structure of metal material, having an upper wall and a substantially horizontal lower wall and two side walls substantially vertical and parallel to each other,
   so that each crash-box module of said two crash-box modules has a front surface shaped like a quadrangular ring, with a horizontal upper edge, a horizontal lower edge, a vertical inner edge, facing towards a center of the cross-member, and a vertical outer edge,
   said front surface of each crash-box module of said two crash-box modules being glued or welded to the rear wall of the cross-member,
   a reinforcing metal plate is-interposed between the front surface of at least one of the two crash-box modules and the rear wall of the cross-member, said metal plate being rigidly connected by welding or gluing both to the rear wall of the cross-member and to the front surface of a crash-box module of said two crash-box modules,
   the rear wall of the cross-member having a depressed flat portion in which said reinforcing plate is received, in such a way that a surface of the reinforcing plate facing the crash-box module is substantially flush with a surface of the rear wall of the cross-member adjacent to said depressed portion,
   said depressed portion of the rear wall of the cross-member within which the reinforcing plate is received being located in an offset position, closer to the center of the cross-member, with respect to said crash-box module,
   in such a way that the reinforcing plate is in contact with just a part of the front surface of the crash-box module, a remaining part of said front surface being in direct contact with the rear wall of the cross-member.

2. A sub-unit according to claim 1, wherein:
   said cross-member has a central portion and two end portions inclined in an arrow-like configuration with respect to the central portion,
   said at least one crash-box module with which the reinforcing plate is associated has a front surface contained in an inclined plane, substantially parallel to the rear wall of the corresponding end portion of the cross-member, so that the vertical inner edge of the front surface of the crash-box module is in a longitudinally more advanced position with respect to the outer vertical edge of said front surface, and
   said depressed portion of the rear wall of the cross-member within which said reinforcing plate is received is located in the aforesaid offset position with respect to the respective crash-box module, in such a way that the reinforcing plate is in contact with the vertical inner edge and with part of the upper and lower edges of the front surface of the crash-box module, but not with the vertical outer edge.

3. A sub-unit according to claim 1, wherein the reinforcing plate has a single flat portion that overlaps said depressed portion of the rear wall of the cross-member.

4. A sub-unit according to claim 1, wherein the reinforcing plate has an L-shaped configuration, with a main portion that overlaps said depressed portion of the rear wall of the cross-member and an end wing welded and glued to the lower wall or upper wall of the cross-member.

5. A sub-unit according to claim 1, wherein the reinforcing plate has a C-shaped configuration, with a main portion that overlaps said depressed portion of the rear wall of the cross-member and two end wings welded or glued to the lower and upper walls of the cross-member.

6. A sub-unit according to claim 1, wherein said cross-member and/or each crash-box module has one or more internal partitions.

7. A method for manufacturing a vehicle structure sub-unit, comprising the steps of:
   forming a cross-member made of metal material, including a front wall, a rear wall, an upper wall and a lower wall,
   providing two crash-box modules each having a tubular structure of metal material with an upper wall, a lower wall and two side walls,
   arranging said crash-box modules with their front surfaces thereof in contact with the rear wall of end portions of the cross-member, and welding or gluing said crash-box modules to said rear wall of the cross-member,
   before connecting the crash-box modules to the cross-member, the rear wall of the aforesaid cross-member being deformed to define a depressed flat portion of said rear wall at a connection area of at least one of said crash-box modules,
   a reinforcing plate being welded or glued within said depressed portion of the rear wall of the cross-member, in such a way that the surface of the reinforcing plate facing the crash-box module is substantially flush with the surface of the rear wall of the cross-member adjacent to said depressed portion,
   after connection of said reinforcing plate to the cross-member, each crash-box module is welded or glued to the rear wall of the cross-member and to said reinforcing plate,
   said depressed portion of the rear wall of the cross-member being formed in an offset position, closer to the center of the cross-member, with respect to a crash-box module of the crash-box modules, with reference to the mounted condition of the crash-box module, in such a way that the reinforcing plate is in contact with just a part of the front surface of the crash-box module, the remaining part of said front surface being in direct contact with the rear wall of the cross-member, and being welded or glued directly to said rear wall.

* * * * *